Patented Oct. 27, 1925.

1,559,341

UNITED STATES PATENT OFFICE.

ROYAL MATTICE, OF BETHLEHEM, PENNSYLVANIA.

RUST-PRODUCING COMPOUND.

No Drawing.   Application filed October 25, 1924.   Serial No. 745,817.

*To all whom it may concern:*

Be it known that I, ROYAL MATTICE, citizen of the United States, residing at Bethlehem, in the county of Northampton and State of Pennsylvania, have invented certain new and useful Improvements in Rust-Producing Compounds, of which the following is a specification.

This invention relates to a rust producing compound and has particular reference to a compound for use in connection with welded structures where it is desired to form rust at the weld.

It has been found in practice that if a cracked, fractured or broken article or structure be repaired by welding, for instance by electric welding, the structure in spite of a most effectual weld will contain numerous pores or minute apertures through which water or other liquid will pass, in the case of pipes, boilers, fire plugs and other similar structures.

It has further been found that after a short period of time such leakage of liquid will cease. This I believe is due to oxidation or in other words the formation of rust which entirely closes or seals these pores or minute apertures. It is therefore the primary object of this invention to produce a compound for producing rust to immediately seal or close any pores or apertures present at a weld.

It is a further object of this invention to provide a compound for producing rust which compound will adhere to the metallic article or structure with which it is being used for at least a sufficient length of time for the rusting process to commence.

Compounds have heretofore been devised for use in producing rust but such compounds have not been of such a nature that they will positively adhere to the article with which they are used and further if such compounds were placed on a perpendicular structure for example, such compound would not adhere at all to the structure.

In view of the above a further object of this invention is to provide a rust producing compound which will adhere to the structure with which it is used and which will fill in the minute pores or apertures at a joint so as to form rust to fill the entire space.

Other objects and advantages of this invention will be apparent from the following description and the particular features of novelty will be pointed out in the appended claims. I desire it understood however that various changes may be made without departing from the spirit of the invention.

I desire it further understood that the invention is not restricted to the production of rust at a welded joint but it is applicable wherever it is desired to form rust.

As the essential element of this compound, I first take iron filings and pass a current of electricity therethrough in order to magnetize the same.

I next mix these magnetized iron filings with a quantity of sal ammoniac (ammonium chloride) in the proportions of 60% in quantity of iron filings to 40% in quantity of sal ammoniac. I next add to the mixture of magnetized iron filings and sal ammoniac sufficient ammonia to obtain a rather thick paste. It is also advisable to add a small quantity of sulphur to the mixture and about $\frac{1}{10}$ to $\frac{1}{2}$ of 1% by volume is added.

When the compound is manufactured commercially the mixture of magnetized iron filings and sal ammoniac is kept at hand ready for sale and a welder can then take this mixture and add the required amount of ammonia and sulphur to complete the paste. However the paste may be manufactured and sold in its paste form if desired.

In use, the paste as just described is laid completely over the weld or the joint where it is desired to form rust and due to the magnetized iron filings the paste will be drawn into any apertures or openings in the weld or at the joint. Further, it will be apparent that this paste will adhere to the article with which it is being used because of the magnetized iron filings and therefore the paste may be applied to the top, bottom or sides of any article satisfactorily.

Immediately after the paste has been applied to the article, the rusting commences. While the theory of this rusting is not entirely known at the present time I believe the reactions are as specified herein. The ammonia will collect carbon dioxide from the atmosphere and it is well known that carbon dioxide and carbonates act to increase the oxidation of iron surfaces. It is probable that minute amounts of iron chloride will be formed, due to the joint presence of ammonium chloride (sal ammoniac) and ammonia. Such iron compounds most certainly will be changed in the presence of air and iron to form hydrated oxides on iron.

It will be apparent that because of the magnetism of the iron filings, the paste will be drawn into any apertures in which rust should be formed and that rust will be formed to seal and close completely all apertures, the entire depth thereof. This is in contradistinction to the usual rusting heretofore known in this art in which the rust which is designedly formed is formed only on the surface of the joint and any minute apertures or pores are closed at the surface rather than being entirely filled with rust.

It is believed that the invention will be fully apparent to those skilled in the art and having thus described the invention what I claim as new and desire to secure by Letters Patent is:

1. A rust producing compound including magnetized iron filings.

2. A rust producing compound comprising iron filings, ammonium chloride and ammonia.

3. A rust producing compound comprising magnetized iron filings, ammonium chloride and ammonia.

In testimony whereof I hereunto affix my signature.

ROYAL MATTICE.